2,912,435
PROCESS FOR PREVENTING THE AGGLOMERATION OF HEXAMETHYLENE TETRAMINE

Heinrich Scholz, Ludwigshafen (Rhine), Germany, assignor to Badische Anilin- & Soda-Fabrik Aktiengesellschaft, Ludwigshafen (Rhine), Germany No Drawing. Application October 7, 1957
Serial No. 688,397

Claims priority, application Germany November 6, 1956

13 Claims. (Cl. 260—248.5)

This invention relates to an improved process for preventing the agglomeration of hexamethylene tetramine. More specifically, it relates to a process in which organic substances are used to prevent hexamethylene tetramine from agglomerating to large lumps.

It has heretofore already been known that hexamethylene tetramine tends to form lumps or to agglomerate when stored. This tendency makes itself unpleasantly felt in further processing the product when this has been stored for a long time. Thus it requires additional operations to be incurred for crushing and comminuting the lumps.

One object of my invention is to prevent the formation of lumps by agglomeration of finely crystalline hexamethylene tetramine even over a long period of storage.

A further object of my invention is to prevent the lump formation with hexamethylene tetramine by using substances which are not in any way restrictive to the range of use of the hexamethylene tetramine and as a result can remain in the hexamethylene tetramine while this is being further processed.

Yet another object of my invention is to prevent the agglomeration of hexamethylene tetramine by using such substances as bring about this effect even when added in small amounts, as can be readily identified and yet do not adversely affect the chemical behavior and external appearance of the hexamethylene tetramine in which they are incorporated.

I have found that hexamethylene tetramine can be stored in a loose, freely-running condition, without an agglomeration or formation of lumps, by incorporating it with a small amount of a benzene monocarboxylic acid.

Suitable benzene monocarboxylic acids are benzoic acid and especially the derivatives of the said acid which in the nucleus are substituted by halogen atoms or lower alkyl groups. Examples of the said derivatives of benzoic acid are chlorbenzoic acids and methylbenzoic acids.

The amount of the acids to be added as such or in admixture with each other to the hexamethylene tetramine can be very small. In general additions of 0.1 to 1% by weight, advantageously 0.3 to 0.5% by weight, with reference to the weight of the hexamethylene tetramine are sufficient in order to prevent an agglomeration of industrially obtained, centrifuged and dried crystalline, or subsequently finely ground, hexamethylene tetramine.

The mixing can be effected for example by mixing the dry crystalline and if desired ground hexamethylene tetramine in a mixing apparatus or by addition to the crystalline product during a grinding operation. The benzene monocarboxylic acids may, however, also be introduced into a solution, for example an aqueous solution, of the hexamethylene tetramine at room or elevated temperature, for example at 20° to 100° C., and the hexamethylene tetramine then separated, for example by evaporating the solvent and subsequently centrifuging the solid material. This method of operation is especially advantageous because the agglomeration inhibiting property may be imparted to the hexamethylene tetramine at the same time when it is obtained from the reaction solution obtained by the reaction of aqueous formaldehyde solutions with ammonia.

That benzene carboxylic acids, as for example benzoic acid, would keep hexamethylene tetramine from lumping together or agglomerating was not to be expected, because benzoic acid by itself is known to have a tendency towards agglomerating and becoming sticky.

Unlike the substances heretofore used in practice for preventing the agglomeration of hexamethylene tetramine, such as zinc stearate, magnesium silicate or silica, the new protective substances in accordance with my invention are not in any way injurious when the hexamethylene tetramine with which they are incorporated is being further processed, because they are water-soluble and cannot lead to any stoppages by the separation of solids in the later processing of the hexamethylene tetramine in liquid media.

The following examples will further illustrate this invention but the invention is not restricted to these examples. The parts specified in the examples are parts by weight.

Example 1

100 parts of finely crystallized dry hexamethylene tetramine, which has been obtained by evaporation of a technical-grade hexamethylene tetramine solution, are well mixed with 0.5 part of finely ground benzoic acid. Even after 5 months the product is still in a free-flowing condition and no agglomeration has taken place.

If the same hexamethylene tetramine is stored in the same way but without an addition of benzoic acid, it becomes lumpy and loses its capacity of flowing free after 3 days.

Example 2

100 parts of crystallized dry hexamethylene tetramine are finely ground to a floury powder with 0.3 part of benzoic acid in a mill. The resultant powder exhibits no agglomeration even after storage for 6 months. A sample of the same hexamethylene tetramine without any addition, however, becomes lumpy after 3 days.

Example 3

100 parts of crystallized dry hexamethylene tetramine are well mixed with 0.5 part of para-chlorbenzoic acid. The mixture is still loose and exhibits no lump formation after a storage time of 4 months.

The same stability in storage will be found in a mixture in which the same amount of para-toluic acid instead of the para-chlorbenzoic acid is used.

If, however, the same hexamethylene tetramine is stored under the same conditions without the addition of a benzene monocarboxylic acid, the product becomes strongly agglomerated after 3 days.

Example 4

5 parts of benzoic acid are dissolved in 2,500 parts of a 40% aqueous hexamethylene tetramine solution. From this solution, by evaporating the water at reduced pressure, about 1,000 parts of a dry hexamethylene tetramine are obtained, in which no indication of a lump formation becomes noticeable even after 5 months storage.

Equally good results are obtained by using para-chlorbenzoic acid or toluic acid instead of benzoic acid.

Example 5

200 parts of finely crystallized dry hexamethylene tetramine obtained by evaporation of a technical-grade aqueous hexamethylene tetramine solution have added to them 2 parts of finely ground para-toluic acid. The product remains in a free-running condition without agglomeration taking place after a 5 months storage. If the same hexamethylene tetramine be stored in the same way but without the addition of para-toluic acid, it becomes markedly lumpy and loses its capacity of running free even after 3 days.

*Example 6*

300 parts of crystallized dry hexamethylene tetramine are ground to a floury powder with 0.3 part of powdered ortho-chlorbenzoic acid in a mill. The powder obtained undergoes no agglomeration even after storage for 5 months. A sample of the same hexamethylene tetramine to which no such addition is made becomes lumpy, however, after a few days.

*Example 7*

10 parts of ortho-toluic acid are dissolved at room temperature in 2,500 parts of a 40% aqueous solution of hexamethylene tetramine. By evaporation of the water from this solution under reduced pressure, about 1,000 parts of dry hexamethylene tetramine are obtained in which no lumpiness can be detected after a storage for 4 months.

*Example 8*

10 parts of benzoic acid are dissolved in 5,000 parts of a 40% aqueous solution of an industrially made hexamethylene tetramine being about 70° to 80° C. hot. From this solution, by evaporation of the water, about 2,000 parts of dry hexamethylene tetramine are obtained which even after a five months storage is without any indication of a lump formation.

What I claim is:

1. Hexamethylene tetramine to which has been added a predetermined minor quantity with reference to the hexamethylene tetramine of a benzene monocarboxylic acid selected from the group consisting of benzoic acid, methylbenzoic acid and chlorbenzoic acid, said quantity being sufficient to retard agglomeration on storage and small enough so that the resultant composition retains substantially the chemical behavior and the external appearance of the hexamethylene tetramine.

2. A composition as claimed in claim 1 in which the amount of the benzene monocarboxylic acid is at least about 0.1% by weight with reference to the amount of hexamethylene tetramine.

3. As a composition of matter non-agglomerating on storage, hexamethylene tetramine containing from 0.1 to 1% of its weight of a benzene monocarboxylic acid selected from the group consisting of benzoic acid, methylbenzoic acid and chlorbenzoic acid.

4. Hexamethylene tetramine to which has been added a predetermined minor quantity of benzoic acid with reference to the hexamethylene tetramine, said quantity being at least about 0.1% by weight of the hexamethylene tetramine and being sufficient to retard agglomeration on storage and small enough so that the resultant composition retains substantially the chemical behavior and the external appearance of the hexamethylene tetramine.

5. Hexamethylene tetramine to which has been added a predetermined minor quantity of para-chlorbenzoic acid with reference to the hexamethylene tetramine, said quantity being at least about 0.1% by weight of the hexamethylene tetramine and being sufficient to retard agglomeration on storage and small enough so that the resultant composition retains substantially the chemical behavior and the external appearance of the hexamethylene tetramine.

6. Hexamethylene tetramine to which has been added a predetermined minor quantity of para-toluic acid with reference to the hexamethylene tetramine, said quantity being at least about 0.1% by weight of the hexamethylene tetramine and being sufficient to retard agglomeration on storage and small enough so that the resultant composition retains substantially the chemical behavior and the external appearance of the hexamethylene tetramine.

7. Hexamethylene tetramine to which has been added a predetermined minor quantity of ortho-chlorobenzoic acid with reference to the hexamethylene tetramine, said quantity being at least about 0.1% by weight of the hexamethylene tetramine and being sufficient to retard agglomeration on storage and small enough so that the resultant composition retains substantially the chemical behavior and the external appearance of the hexamethylene tetramine.

8. Hexamethylene tetramine to which has been added a predetermined minor quantity of ortho-toluic acid with reference to the hexamethylene tetramine, said quantity being at least about 0.1% by weight of the hexamethylene tetramine and being sufficient to retard agglomeration on storage and small enough so that the resultant composition retains substantially the chemical behavior and the external appearance of the hexamethylene tetramine.

9. A process of retarding agglomeration of solid hexamethylene tetramine on storage which comprises intimately mixing the hexamethylene tetramine with a minor quantity of a benzene monocarboxylic acid selected from the group consisting of benzoic acid, methylbenzoic acid and chlorbenzoic acid, said quantity being sufficient to retard agglomeration on storage and small enough so that the resultant composition retains substantially the chemical behavior and the external appearance of the hexamethylene tetramine.

10. The process as claimed in claim 9 which comprises mixing together the hexamethylene tetramine and the benzene monocarboxylic acid in a solid condition.

11. The process as claimed in claim 9 which comprises dissolving the benzene monocarboxylic acid in an aqueous solution of hexamethylene tetramine and then recovering the solid hexamethylene tetramine containing the benzene monocarboxylic acid from said solution.

12. A process of rendering solid hexamethylene tetramine non-agglomerating on storage which comprises mixing together in a solid condition hexamethylene tetramine with about 0.1 to about 1% by weight of a monobenzene carboxylic acid selected from the group consisting of benzoic acid, methylbenzoic acid and chlorbenzoic acid.

13. A process of rendering solid hexamethylene teramine non-agglomerating on storage which consists essentially in dissolving in an aqueous solution of hexamethylene tetramine about 0.1 to about 1% by weight, with reference to the amount of hexamethylene tetramine, of a benzene monocarboxylic acid selected from the group consisting of benzoic acid, methylbenzoic acid and chlorbenzoic acid, and recovering the solids from said solution.

References Cited in the file of this patent

UNITED STATES PATENTS 1,652,796   Raiziss et al. _____ Dec. 13, 1927

OTHER REFERENCES

Bouchereau: Journal de Pharmacie et de Chemie, 8ᴱ Serie, vol. 28, pp. 487–488 (1938).